(12) United States Patent
Oliphant et al.

(10) Patent No.: US 9,587,766 B2
(45) Date of Patent: Mar. 7, 2017

(54) METHOD OF INSTALLING PIN PILES INTO A SEABED

(71) Applicant: TECHNIP FRANCE, Courbevoie (FR)

(72) Inventors: John Oliphant, Edinburgh (GB); Abiola Ojo, Aberdeen (GB); Alasdair Maconochie, Kinmuck (GB)

(73) Assignee: TECHNIP FRANCE (FR)

( * ) Notice: Subject to any disclaimer, the term of this patent is extended or adjusted under 35 U.S.C. 154(b) by 0 days.

(21) Appl. No.: 14/786,314

(22) PCT Filed: Apr. 11, 2014

(86) PCT No.: PCT/IB2014/000946
§ 371 (c)(1),
(2) Date: Oct. 22, 2015

(87) PCT Pub. No.: WO2014/174366
PCT Pub. Date: Oct. 30, 2014

(65) Prior Publication Data
US 2016/0061353 A1      Mar. 3, 2016

(30) Foreign Application Priority Data
Apr. 23, 2013   (GB) .................................. 1307283.0

(51) Int. Cl.
*E02D 7/00* (2006.01)
*F16L 1/16* (2006.01)
(Continued)

(52) U.S. Cl.
CPC ................ *F16L 1/201* (2013.01); *E02D 5/54* (2013.01); *E02D 7/00* (2013.01); *E02D 7/08* (2013.01); *E02D 7/14* (2013.01); *F16L 1/16* (2013.01)

(58) Field of Classification Search
CPC .................................... E02D 7/00; E02D 7/02
See application file for complete search history.

(56) References Cited

U.S. PATENT DOCUMENTS 3,496,900 A      2/1970   Mott et al.
3,846,991 A  *  11/1974  Wisotsky ................ E02B 17/02
                                                                173/1
(Continued)

FOREIGN PATENT DOCUMENTS

EP       2 049 388 B1    1/2011
EP       2 299 006 A1    3/2011
(Continued)

OTHER PUBLICATIONS

Search Report dated Sep. 29, 2013 issued in corresponding Great Britain Patent Application No. GB1307283.0.
(Continued)

*Primary Examiner* — Frederick L Lagman
(74) *Attorney, Agent, or Firm* — Ostrolenk Faber LLP

(57) ABSTRACT

A method of installing a plurality of pin piles into a seabed including at least the steps of: (a) lowering a pin pile apparatus comprising a first pin pile and an attached clump weight towards the seabed; (b) allowing the first pin pile to self-penetrate the seabed based on self-weight of the pin pile apparatus and the momentum from step (a) until the clump weight reaches the sea bed; (c) disconnecting the clump weight from the first pin pile; and (d) recovering the clump weight for use with a second pin pile and repeating steps (a)-(c). In this way, the pin piles are easily installed from their descent to the seabed with the clump weight, which can then be removed and applied to the next pin pile in an easy and repeatable operation without requiring a suction apparatus or hammer or drill.

6 Claims, 3 Drawing Sheets

(51) Int. Cl.
*F16L 1/20* (2006.01)
*E02D 5/54* (2006.01)
*E02D 7/08* (2006.01)
*E02D 7/14* (2006.01)

(56) References Cited

U.S. PATENT DOCUMENTS

| | | | | |
|---|---|---|---|---|
| 3,861,156 A * | 1/1975 | Uchida | ............ | E02B 17/02 254/29 R |
| 4,069,681 A | 1/1978 | Mott | ............ | 61/89 |
| 4,390,307 A * | 6/1983 | Rice | ............ | E02D 7/00 173/117 |
| 4,637,757 A * | 1/1987 | Aagaard | ............ | E02D 5/54 405/227 |
| 5,540,523 A * | 7/1996 | Foret, Jr. | ............ | E02D 7/00 405/228 |
| 5,915,326 A | 6/1999 | Karal | | |
| 6,368,021 B1 * | 4/2002 | Strong | ............ | E21B 7/20 175/171 |
| 6,659,182 B1 * | 12/2003 | Saugier | ............ | E21B 19/002 166/358 |
| 7,140,319 B2 * | 11/2006 | Raines | ............ | B63B 21/27 114/296 |
| 7,527,455 B2 | 5/2009 | Raines | | |
| 2006/0127187 A1 | 6/2006 | Raines | ............ | 405/226 |
| 2010/0012336 A1 * | 1/2010 | Adamson | ............ | E02D 7/02 173/1 |
| 2010/0061810 A1 * | 3/2010 | Breaux | ............ | E02D 27/50 405/228 |

FOREIGN PATENT DOCUMENTS

| | | |
|---|---|---|
| JP | 6-146791 | 5/1994 |
| JP | 2005-282139 | 10/2005 |
| WO | WO 2009/105630 A1 | 8/2009 |

OTHER PUBLICATIONS

International Preliminary Report on Patentability and the Written Opinion of the International Searching Authority dated Oct. 27, 2015.

International Search Report dated Sep. 18, 2014 issued in corresponding International patent application No. PCT/IB2014/000946.

* cited by examiner

METHOD OF INSTALLING PIN PILES INTO A SEABED

CROSS REFERENCE TO RELATED APPLICATIONS

The present application is a 35 U.S.C. §371 National Phase conversion of PCT/IB2014/000946, filed Apr. 11, 2014, claiming the benefit of United Kingdom Application no. 1307283.0, filed Apr. 23, 2013, the disclosure of which is incorporated herein by reference. The PCT International Application was published in the English language.

TECHNICAL FIELD OF THE INVENTION

The present invention relates to a method of installing a plurality of pin piles in a seabed, and a pin pile apparatus for such method.

BACKGROUND OF THE INVENTION

It is commonly desired to install "anchors" in a seabed or sea floor to provide mooring to one or more vessels or installations used in the offshore industry. Such anchors can be termed "pile anchors" or "anchor piles" or "mooring anchors" and the like. All of these anchors are intended to be capable of resisting both horizontal and vertical movement, and thus provide anchoring or stability to vessels, rigs, drilling or floating platforms, etc. in a manner known in the art.

Typically, such anchors are elongate hollow bodies which are driven into the seabed or sea floor, sometimes using "suction" within the anchor to increase the ability of the anchor (by means of negative pressure within it) to be pressed down into the seabed. Examples include U.S. Pat. No. 3,496,900, U.S. Pat. No. 5,915,326 and U.S. Pat. No. 7,527,455.

Such anchors as described above are generally relatively large to provide mooring or stability to drilling platforms. As such, they require one or more installation mechanisms such as hammers or drills or suction, to be installed. Typically, such anchors are 40-50 m long, and have a 5-10 m outer diameter.

'Pin piles' are very much smaller anchor piles. They are also well known in the art, generally being less than 10 m long or even 5 m long, with a diameter of a meter or less. Pin piles are clearly a magnitude smaller in size than the larger pile anchors, etc., making their provision and handling easier. Whilst they can also be used to anchor or moor some surface vessels or apparatus, they are more commonly used for assisting seabed or sea floor apparatus or operations. However, the installation of pin piles is currently still based on the use of the same large installation apparatus and methods as pile anchors, thus requiring the same (significant) CAPEX and OPEX as pile anchors.

SUMMARY OF THE INVENTION

It is an object of the present invention to provide an improved and less costly method of installing pin piles into a seabed.

According to one aspect of the present invention, there is provided a method of installing a plurality of pin piles into a seabed comprising at least the steps of:

(a) lowering a pin pile apparatus comprising a first pin pile and an attached clump weight towards the seabed;

(b) allowing the first pin pile to self-penetrate the seabed based on the self-weight of the pin pile apparatus and the momentum from step (a) until the clump weight reaches the sea bed;

(c) disconnecting the clump weight from the first pin pile; and (d) recovering the clump weight for use with a second pin pile and repeating steps (a)-(c).

In this way, the pin piles are easily installed from their descent to the seabed with the clump weight, which can then be removed and applied to the next pin pile in an easy and repeatable operation without requiring a suction apparatus or hammer or drill.

Generally, the method of the present invention is provided from one or more installation vessels or barges, optionally also able to provide the required lowering apparatus such as one or more winches for the pin pile apparatus from a sea surface, optionally from the surface of the installation vessel or an accompanying barge, to the seabed.

In the method of the present invention, the pin pile apparatus can be lowered towards the seabed, optionally based on one or more winches and gravity. Operation of the winch(es) can be predetermined to ensure the correct lowering, in particular the correct speed and descent, of the pin pile apparatus towards the seabed, such that the pin pile is able to self-penetrate the seabed based on the pin pile apparatus weight and momentum from its lowering, until the clump weight reaches the seabed.

The nature of the seabed is to allow self-penetration of the pin piles, where the seabed soil conditions permit. Such seabeds are usually defined as 'soft seabeds', such as soft clay, and including deep water clay.

Disconnection of the clump weight from the first pin pile can be carried out by any suitable operator such as a diver or ROV. Where the pin pile is attached to the clump weight using attachments comprising a collar and one or more pins or bolts, the disconnection may be achieved by movement of the pins from an attachment position to a release position, optionally being still within the collar or remote from the collar.

Following disconnection of the clump weight from the pin pile, the clump weight is recovered for use with a second pin pile. Such recovery may be provided by raising the clump weight using the same winch or winches used to control the lowering of the pin pile apparatus, and which may still be attached to the clump weight. Once the clump weight has been recovered, it can be attached to a second pin pile in the same manner and configuration as its attachment to the first pin pile.

Repetition of steps (a-d) of the method of the present invention allows for quick and easy installation of a plurality of pin piles, optionally within a close or defined seabed area, for subsequent use.

Pin piles are known in the art, and are generally elongate with at least a portion having a circular cross section, although the invention is not limited thereto. Preferably, the pin piles are less than 10 m or less than 5 m long, such as being between 2 m-4 m in length.

The outer diameter of circular pin piles could be any size up to 1 m or beyond, generally in the range 10-20 cm to 50-70 cm, such as between 6"-24" or 15 cm-61 cm outer diameter.

The pin piles may be solid or hollow, or any arrangement of partially solid and partially hollow. The pin piles could comprise hollow tubular sections, H sections, solid section or indeed any other sectional shape.

Optionally, the pin piles are hollow elongate tubes with a regular circular cross section therealong.

The pin piles may include one or more fins either in a symmetric or non-symmetric lateral arrangement around part or all of the pin pile length. The use of four equally spaced fins can form a cruciform pile, whilst other shapes and arrangements are known in the art. The use of fins increases the lateral resistance to movement of the piles.

The clump weight may be any suitable size, shape and design, and may be formed from any suitable material. One suitable material is concrete or a concrete based material.

Preferably, the clump weight has an aperture. More preferably, the clump weight has a central aperture, being central to both the shape and centre of gravity of the clump weight.

The aperture may have any suitable shape, size or design able to locate a pin pile therewithin or therethrough. Preferably, the aperture has a complementary shape to the outer diameter shape of the pin pile. Where the pin pile is circular or generally circular, the aperture may have a complementary circular shape such as in the form of a bore from one side of the clump weight to the other.

Optionally, there are one or more attachments between the pin pile and the clump weight to allow their connection and disconnection. The or each attachment may be the same or different, and may be based on being wholly or substantially on or in the clump weight, being wholly or substantially on or in the pin pile, or being arranged between both the pin pile and clump weight for subsequent engagement.

Preferably, the clump weight includes an attachment able to attach the clump weight to a pin pile, and subsequently to be disconnected from the pin pile.

In one embodiment of the present invention, an attachment comprises a sleeve or collar extending in, through and/or from the clump weight, and including one or more fastening members or means.

In one embodiment of the present invention, the fasting means comprises one or more pins, bolts, studs or the like, adapted to have lateral motion through the attachment between an attachment position to secure a pin pile within the attachment, and a release position wherein the pin pile is disconnectable from the attachment. The release position may or may not involve dissociation of the fastening means with the attachment.

Preferably, the clump weight includes an upstanding collar being co-axial with a central bore through the clump weight, and having one or more lateral and moveable pins therethrough. The attachment may be formed of the same or different material as the clump weight, optionally with one or more inserts to accommodate complementary housing for a fastening means or member.

The size, mass and in particular weight of the clump weight may be adapted to suit the parameters of the pin pile, the known or expected parameters of the seabed or sea floor, and other possible conditions including sea conditions between a launching vessel and the seabed. As an example, where the pin piles are between 2 m-4 m in length, a suitable clump weight may be between 10 tonnes and 20 tonnes in weight.

According to another aspect of the present invention, there is provided a pin pile apparatus comprising a hollow or solid pin pile and a separable and reusable clump weight, optionally for use in a method of installing a plurality of pin piles as described herein.

The use of a plurality of pin piles embedded into a seabed includes:

Routing and/or directing and/or locating a pipeline or umbilical on or next to the seabed, in particular to avoid one or more positions or locations such as geohazards.

Holding, tethering or otherwise providing stability to a pipeline or umbilical at or near the seabed; and/or Locating and optionally holding one or more subsea installations or units involved in the offshore industry, in particular involved in pipelines and umbilicals, such as a mudmat.

The invention is not limited to such uses. The invention is particularly useful where significant control over the location of the pipeline or the other seabed facility is required, usually due to the location of other units, pipelines or natural obstacles.

Thus, according to another aspect of the invention, there is provided a method of providing route curve stability for a pipeline on or near a seabed comprising at least the steps of:

(i) installing a plurality of pin piles along the route using the method as described herein; and (ii) connecting the pipeline to the pin piles.

In this way, the pin piles can be used to help keep the pipeline within a tolerable lay radius, and provide 'stability' over its curving along a desired or necessary unstraight route. The pipeline can be connected to the pin piles using any suitable connectors such as chains etc.

According to another aspect of the invention, there is provided a method of providing a mudmat on a seabed comprising at least the steps of:

(i) providing a mudmat on the seabed; and (ii) installing a plurality of pin piles using the method as described herein through the mudmat.

BRIEF DESCRIPTION OF THE DRAWINGS

Embodiments of the present invention will now be described by way of example only and with reference to the accompanying drawings in which.

DESCRIPTION OF PREFERRED EMBODIMENTS

Figure 1:
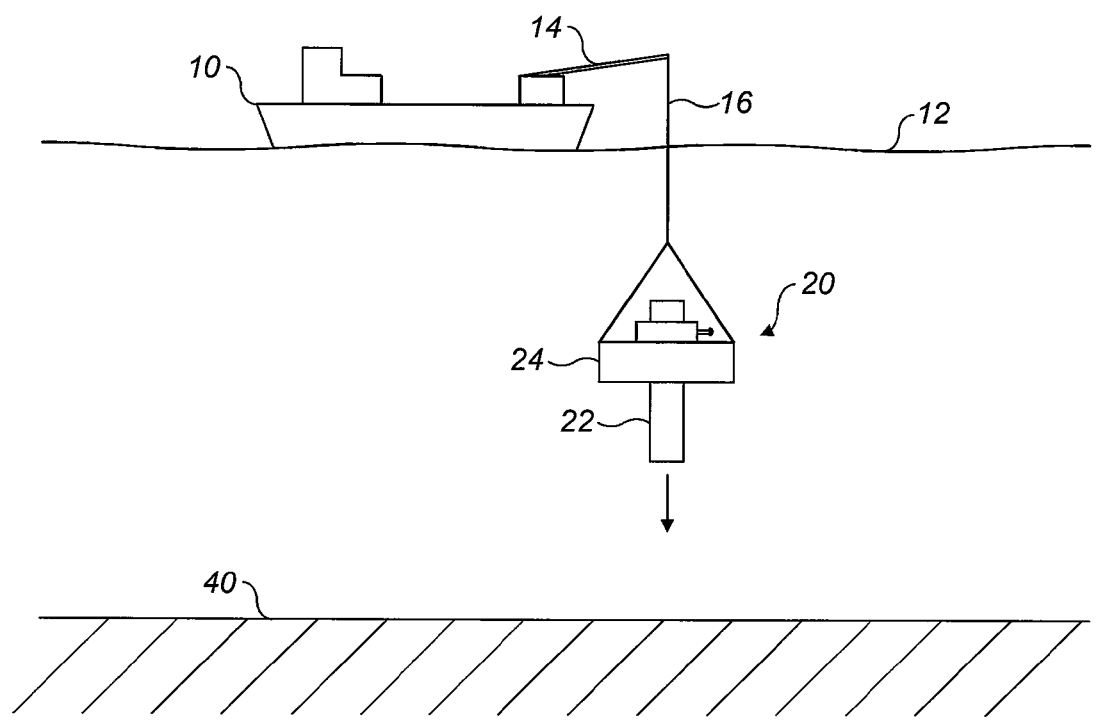
FIG. 1 is a schematic side view of a first step in a method of installing a plurality of pin piles into a seabed according to one embodiment of the present invention.

Referring to the drawings, FIG. 1 shows an installation vessel 10 on a sea surface 12 having a winch 14 from which extends a winch line 16.

Figure 5:
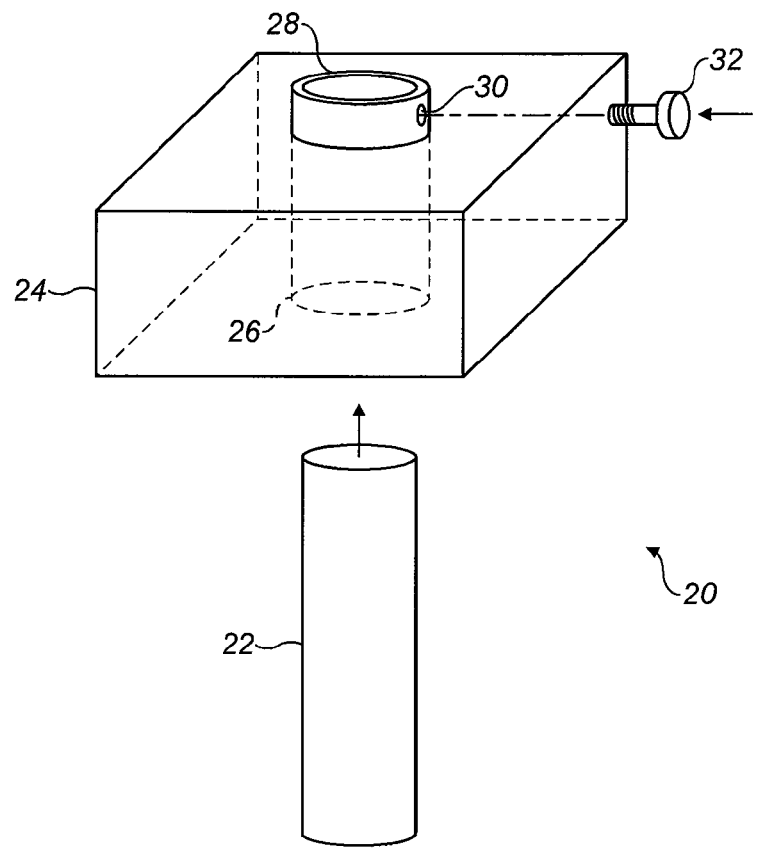
FIG. 5 is schematic perspective view of a pin pile apparatus according to another embodiment of the present invention.

FIG. 1 also shows a pin pile apparatus 20, is shown in more detail in FIG. 5.

FIG. 5 shows the pin pile apparatus 20 comprising a pin pile 22 and separable clump weight 24. The pin pile 22 is approximately 3 m in length and generally cylindrical. It is generally formed from a steel, concrete, or combinations of metals and concrete.

The clump weight 24 may be formed from concrete, or a concrete based material, or steel, and has a central bore to allow passage of the shape of the pile pin 22 therethrough. Upstanding from the top surface of the clump weight 24 is a hollow collar 28 having the same inner diameter as the bore 26 and being co-axial therewith. In the collar 28 is at least one aperture 30 into and through which a complementary bolt or pin 32 can be inserted for lateral movement through the collar 28.

The aperture 30 may be directly formed in the collar 28, or formed in one or more housings (not shown) fitted within the collar 28. Optionally, the inner surface of the aperture 30 has a complementary shape to a fastening surface of the pin 32, such that the pin 32 can be tightened as it moves laterally inwardly through the collar 28.

In use, the pin pile 22 is located within the bore 26 and collar 28 such that it extends from the lower surface of the clump weight 24 by the desired installation depth of the pin pile 22. The one or more pins 32 can then be moved from a disengaged position, optionally separate from the collar 28, to an attachment position, wherein the ends of the pins 32 engage the surface of the pin pile 22 and attach the pin pile 22 to the clump weight 24, optionally based on tightening or other constriction thereinbetween.

As shown in FIG. 1, the pin pile arrangement 20 can then be attached to the winch line 16. Preferably, the winch line 16 is only connected to the clump weight 24 via one or more suitable attachment points and devices (not shown) able to provide the desired controlled lowering of the pin pile apparatus 20 from the sea surface 12 to a seabed 40.

Figure 2:
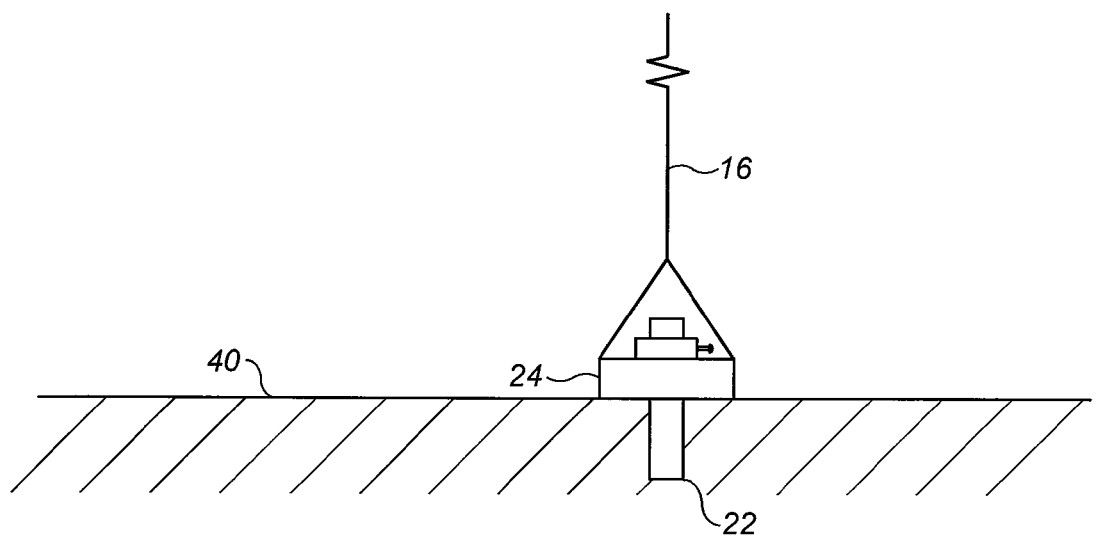
FIGS. 2-4 are schematic side views of subsequent steps in the method of FIG. 1.

FIG. 2 shows the step of the pin pile 22 penetrating the seabed 40 based on its own self-weight and its momentum from the lowering of the pin pile apparatus 20 as shown in FIG. 1, until the clump weight 24 reaches the seabed 40. In this way, the installer is ensured of the correct and desired installation of the pin pile 22 into the seabed, whilst not having to provide any additional installation apparatus, units or devices, such as hammers or suction apparatus.

Figure 3:
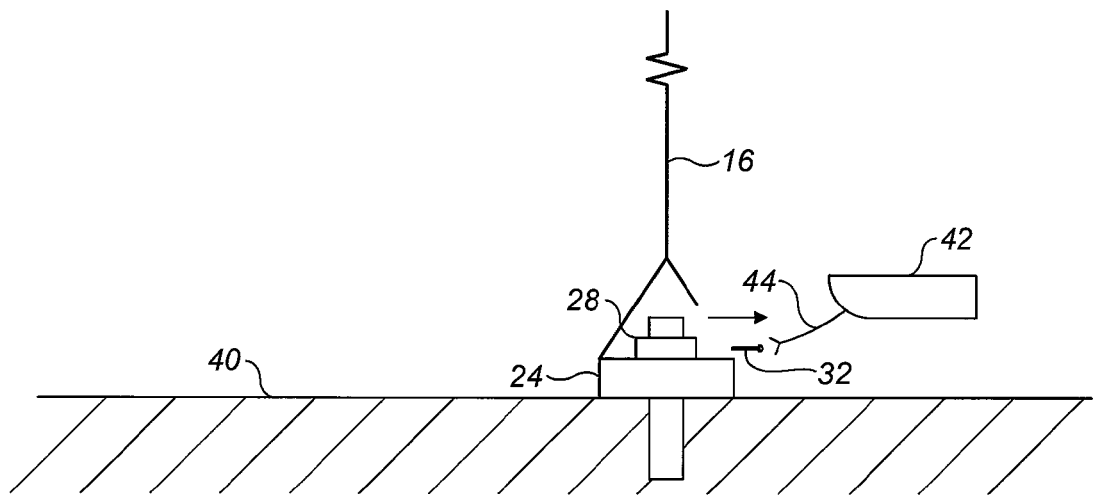

FIG. 3 shows the step of an ROV 42 having an arm 44 able to reach the pin 32 and move the pin 32 from an attachment position to a release position, optionally being separable from the collar 28. In this way, the clump weight is then 'disconnected' from the pin pile 22, i.e. detached therefrom and able to move independently.

Figure 4:
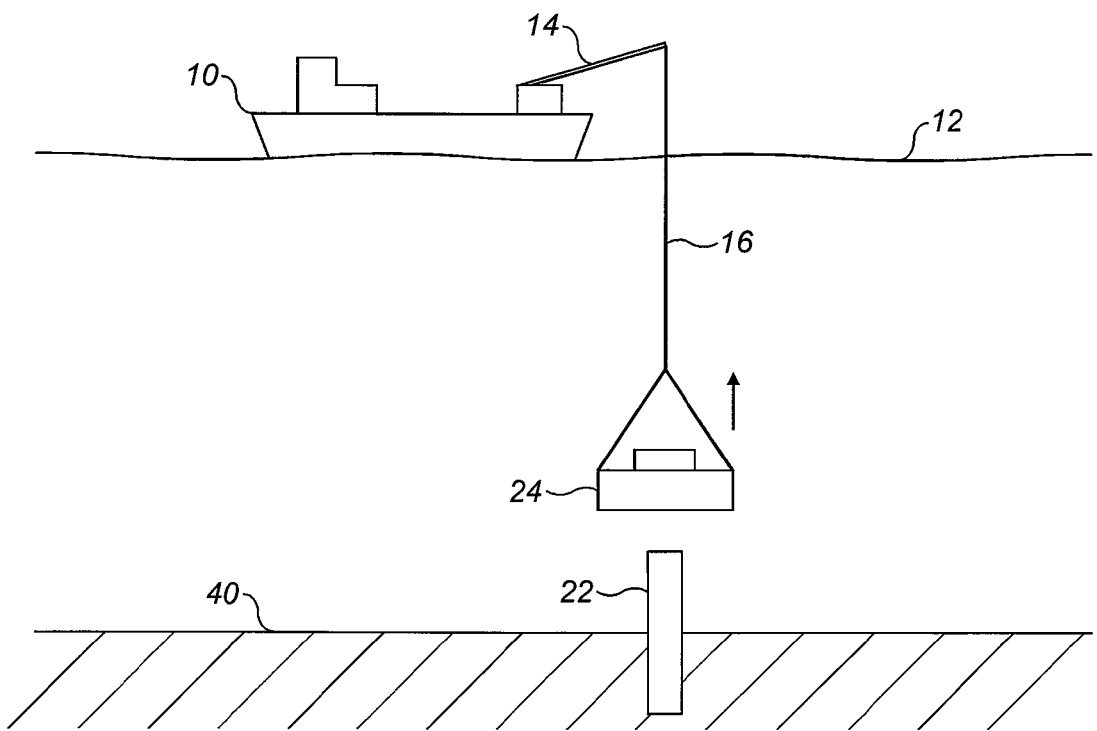

FIG. 4 shows the step of recovering the clump weight 24 for use with a second pin pile (not shown). The clump weight 24 can simply be recovered by the winch 14 lifting the clump weight 24 back on to the installation vessel 10. Once the second pin pile is attached to the clump weight 24, the operational steps shown in FIGS. 1-3 can be repeated to install the second pin pile, and so forth repeatedly.

As shown by the steps of FIGS. 1-4, a plurality of pin piles can be installed into a seabed in a rapid and easy manner, using the same methodology to install each pin pile, and involving the single lowering of the pin pile apparatus and the single recovery step of the clump weight in a repeatable manner.

Figure 6:
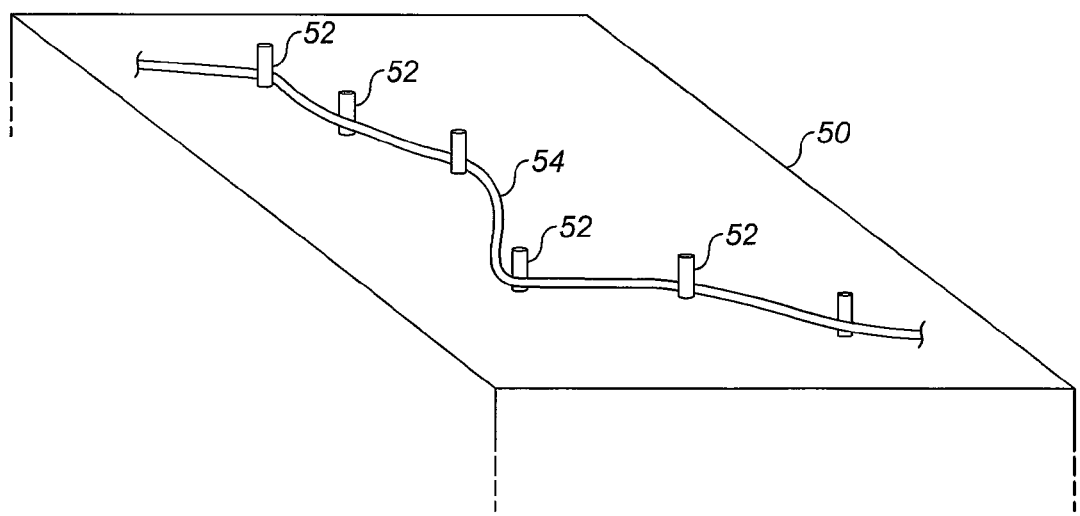
FIG. 6 is perspective schematic view of a plurality of installed pin piles on a seabed, and a pipeline thereinbetween.

FIG. 6 shows a representative area 50 of a seabed having a plurality of pin piles 52 installed thereacross along an unstraight route, so as to provide control of the direction of a pipeline 54 connected thereto, i.e. pipeline route curve stability therealong. This is useful for seabed developments where there may be significant geohazards close to or surrounding the area 50 which have an impact on the selection of the route of a new pipeline thereacross. Conventionally, the practice is to make large deviations in the pipeline route to avoid crossing such geohazards. The use of a number of pin piles for route stability and/or pipeline hold backs, enables the pipeline installer to have better control during the pipeline lay, and therefore be in a position to more gently route around and through geohazards, allowing the selection of more direct, shorter economically attractive routes.

Where soil conditions of the seabed permit, and initiation loads are less than 10 tonnes pin piles, in particular, where the pin piles have a fin or cruciform arrangement, installed pin piles could be used as the starting point of laying small products like umbilical and flexible pipelines on to the seabed. This can also be termed 'initiation', where the product end is held back by a fixed point.

The use of a reusable clump weight and relatively small pin piles may also offer significant savings and deck space on an installation vessel or accompanying barge, over the use of conventional clump weights as turning points. This is particularly where there are a number of turning points to install and transit to the site of use is significantly long.

Incorporation of pin piles as part of a PLEN/PLET mudmat could also increase the lateral resistance of the mudmat foundation by approximately 10% to 20%, depending on soil conditions and pile size. By using pin piles, the mudmat size could therefor be reduced and/or optimized, and would therefor help with the deployment of mudmat through vessel moon pools during pipe lay.

Various modifications and variations to the described embodiments of the invention will be apparent to those skilled in the art without departing from the scope of the invention as defined herein. Although the invention has been described in connection with specific preferred embodiments it should be understood that the invention as defined herein should not be unduly limited to such specific embodiments.

The invention claimed is:

1. A method of installing a plurality of pin piles into a seabed comprising at least the steps of:
    (a) lowering a pin pile apparatus comprising a first pin pile and an attached clump weight towards the seabed, wherein a momentum is generated by the lowering step;
    (b) allowing the first pin pile to self-penetrate the seabed based on self-weight of the pin pile apparatus and the momentum from step (a) until the clump weight reaches the sea bed;
    (c) disconnecting the clump weight from the first pin pile; and
    (d) recovering the clump weight for use with a second pin pile and repeating steps (a)-(c).

2. A method as claimed in claim 1 wherein the pin pile apparatus is lowered towards the sea bed based on one or more winches and gravity.

3. A method as claimed in claim 1 wherein the clump weight is recovered to a sea surface prior to repeating steps (a)-(c).

4. A method as claimed in claim 1 wherein the clump weight is attached to the pin pile comprising a collar and one or more lateral bolts, and wherein step (c) comprises moving the one or more bolts from an attachment position to a release position.

5. A method of providing pipeline route curve stability for a pipeline on or near a seabed comprising at least the steps of:
    (i) installing a plurality of pin piles using the method as described in claim 1 along the defined route; and
    (ii) connecting the pipeline to the pin piles.

6. A method of providing a mudmat on a seabed comprising at least the steps of:
    (i) providing a mudmat on the seabed; and (ii) installing a plurality of pin piles using the method as described in claim 1 through the mudmat.

* * * * *